UNITED STATES PATENT OFFICE.

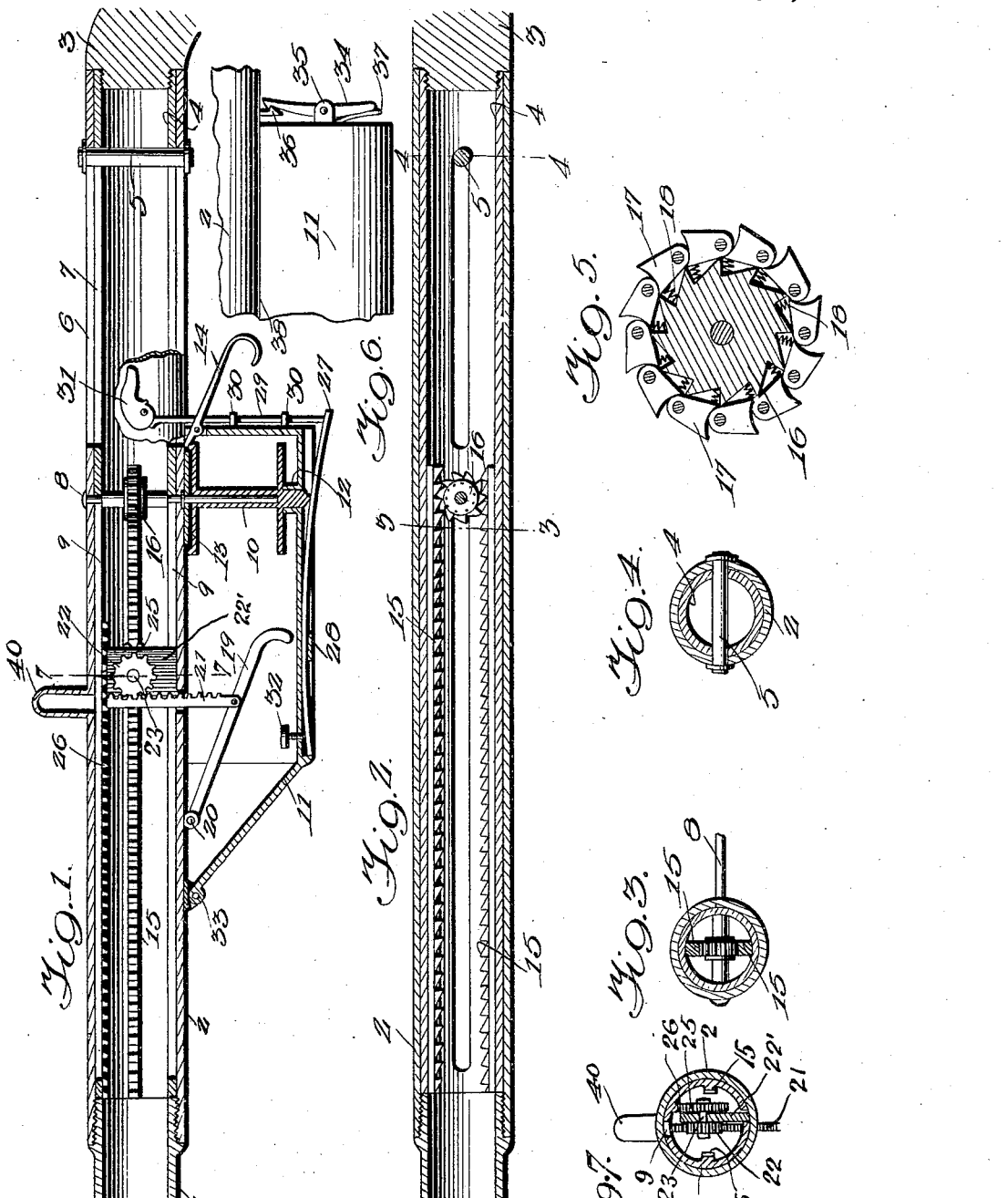

JOHN CLAY CALDWELL, OF MIAMI, FLORIDA.

FISHING ROD.

1,415,310.                    Specification of Letters Patent.        Patented May 9, 1922.

Application filed June 19, 1920. Serial No. 390,162.

*To all whom it may concern:*

Be it known that I, JOHN C. CALDWELL, a citizen of the United States, and a resident of Miami, in the county of Dade and State of Florida, have invented certain new and useful Improvements in Fishing Rods, of which the following is a specification.

My invention is an improvement in fishing rods, and has for its object to provide a rod, wherein the handle is constructed so that a portion thereof may be reciprocated whereby the line may be wound up on the reel, and wherein means is provided controlled by the winding up of the line for laying the line on the reel, and other means for braking the operation of the reel during the unwinding.

In the drawings:

Figure 1 is a longitudinal section of the improved rod,

Figure 2 is a similar view at right angles to Figure 1, certain parts being removed for the sake of clearness, Figures 3 and 4 are sections on the lines 3—3 and 4—4 respectively of Figure 2, Figure 5 is a side view of the ratchet wheel, Figure 6 is a partial side view showing the housing latch, Figure 7 is a detailed section taken on line 7—7 of Figure 1.

In the present embodiment of the invention, the fishing rod 1 is provided with a hollow handle 2 which as shown, has threaded engagement with the rod, and at the end remote from the handle, a grip 3 is provided, the said grip being connected to a sleeve 4 which is mounted to slide in the handle 2, and it will be noticed that the grip has threaded engagement with the sleeve. The sleeve 4 is slidable in the handle and is limited in its sliding movement with respect to the handle by means of a rivet 5. This rivet engages slots 6 and 7 in the handle and sleeve, respectively.

A shaft 8 is journaled transversely of the handle in front of the slot 6, and this shaft extends through slots 9 in the sleeve, and through a reel 10 which is arranged within an extension casing 11 on the handle. The reel as shown is journaled at its outer end in an inwardly extending nipple 12 from the extension, and the shaft is journaled in the reel, the reel moving freely with respect to the shaft.

A disk 13 is secured to the shaft at the inner end of the reel, and this disk is adapted to engage the adjacent face of the adjacent reel end, to brake the movement of the reel. The reel is movable longitudinally on the shaft slightly so that it may be moved toward or from the disk, and a lever 14 is pivoted in a slot in the extension, for engaging the reel to move the same. The adjacent faces of the reel and disk may be provided with surfaces having a high co-efficient of friction if desired, in order that friction may be exerted between the said surfaces to retard the movement of the reel.

The lever 14 at its inner end engages the end of the reel, and the outer end as shown is hooked to form a finger piece for convenience in handling the lever. The line winds upon the reel, and the reel is rotated to wind up the line, by moving the grip and sleeve with respect to the handle.

The arrangement is such that when the sliding sleeves are moved in either direction, the shaft 8 may be rotated but always in the same direction. The rotating means consists of rack bars 15. The said bars are arranged within the handles at opposite sides thereof, and the teeth of the said bars thus face the grip. A wheel 16 is arranged on the shaft in the handle, and to this wheel there is secured a series of pawls 17.

Each of these pawls is pivoted to the wheel, and is normally pressed outwardly by a spring 18, to cause the pawl to engage the teeth of the rack bars. The pawls are so arranged that when the sleeve is moved outwardly for instance, the teeth of the upper rack bar by their engagement with the pawls will rotate the wheel 16 and the reel in a direction to wind up the line.

The teeth of the lower rack bar however, will slip idly over the pawl. When the sleeve is moved inward, the shaft will be rotated in the same direction by the engagement of the teeth of the lower rack bar with the pawls, while the teeth of the upper rack bar will slip idly over the pawls.

By pressing the outer end of the lever 14 toward the handle, the reel is moved outward to free it from disk 13, and when so moved if there is traction of the line, it will unwind from the reel. This lever 14 is used principally in fly castings. The reel is normally pressed toward the disk 13 by means of a plate spring 27, which is connected to the parts in a manner to be presently described, and engages the outer end of the reel as clearly shown in Figure 1.

Means is provided for laying the line on the reel during the winding. The said means is in the form of a lever 19 which acts as a layer. This layer is pivoted to the handle within the extension casing 11, as indicated at 20, and that end of the lever adjacent to the reel is bent laterally or curved to engage the line to lay the same on the reel.

The free end of the lever is moved longitudinally of the reel by means of a rack bar 21. The outer end of this bar is pivoted to the lever 19 and the inner end engages a pinion 22 secured to a shaft 23 rotatably carried by a plate 22' supported within the sleeve 4.

A gear wheel 25 is secured to the shaft, and this gear wheel meshes with a rack bar 26 on the sleeve. When the sleeve is moved longitudinally of the handle, the lever 19 will be swung in opposite directions at its free end, and the line will be laid smoothly on the reel. The reel is normally pressed toward the disk 13 by the spring 27 before mentioned, which is arranged on the outer face of the extension casing, and is held to the said face by a clip 28 arranged transversely of the spring.

That end of the spring adjacent to the reel bears against the end of the reel, the journal pin of the reel being extended from the nipple 12 as shown, and the spring may be pressed outwardly at the said end by means of a rod 29 which is mounted to slide in guides 30 on the end of the extension casing, one end of the rod engaging the spring. The other end of the rod is engaged by a cam lever 31, the said lever being pivoted to the handle. When this lever 31 is swung in the proper direction, that end of the spring adjacent to the reel will be forced outward and the pressure tending to force the reel toward the friction disk will be relaxed.

The opposite end of the spring is engaged by a set screw 32 which is threaded through the wall of the extension casing, and by means of this set screw the tension of the spring may be varied.

The operation of the device is as follows: When it is desired to wind up the line, the sleeve is reciprocated by means of the grip. The reciprocation of the sleeve rotates the reel, and the movement of the sleeve which rotates the reel also operates the layer to lay the line smoothly on the reel. The rack bar 26 extends further toward the body of the rod than do the rack bars 15, so that this rack bar is never out of engagement with the gear wheel. When it is desired to let the line run free, the lever 31 is operated to move the spring 27 outward, thus releasing the friction on the reel. It will be noticed that the pinion and gear wheel are supported by a bracket which is mounted in the handle.

The extension casing 11 is in the form of a housing which is hinged to the handle 2 at the forward end of the housing, as indicated at 33. At the opposite end latch mechanism is provided for holding the extension casing closed, said mechanism comprising a lever 34 which is pivoted to the bracket 35 on the end of the housing, and is normally pressed into engagement with a catch 36 on the handle 2 by means of a spring 37.

By pressing that end of the lever 34 remote from the catch toward the extension housing, the latch is released and the said housing may be swung open. The nipple 12 slips over the end of the reel, and the element 29 is carried with the housing. Access is now given to the layer, to the reel, and to the set screw 32.

In practice the rod is held in the manner illustrated in Figure 1, that is, with the reel down or perpendicular. The reel is held with the lever 14 by pressure of the finger on the lever 14 while the fly is tossed behind. As the fly passes forward on the case, the reel is released by relieving pressure on the lever 14 and the momentum of the fly unwinds the line. As the fly hits the water, the reel is again caught by pressure of the finger on the lever 14 which then acts as a brake to stop further unwinding of the reel.

If there is a strike, the reel is held in its free position with the lever 14 until the cam 31 can be thrown to permit the spring 27 to function. The reel and the layer are both housed in, and the handle 2 has depending flanges indicated at 38 which fit down over the side edges of the housing. It will be understood that the rack bars and ratchet wheel constitute a power transmission mechanism, for continuously rotating the shaft in the same direction.

In order to permit the necessary movement of the rack bar 21, the handle 2 has an extension 40 at its upper side, into which the rack bar may move.

I claim:

1. In a fishing rod, a handle, a reel arranged below the handle, a grip mounted to reciprocate with respect to the handle, a connection between the grip and the reel for continuously rotating the reel in one direction, and a housing for the reel hinged at one end to the handle and having latch mechanism for holding it closed at the other end.

2. A fishing rod comprising a handle, a sleeve slidable therein, a reel associated with the sleeve, a line carrying arm pivoted to said handle and adapted for guiding the line onto the reel, a rack pivoted to said arm for swinging the same, a pinion meshing with said rack, and means operated by the movement of said sleeve to oscillate said pinion.

3. A fishing rod comprising a handle, a sleeve slidable therein, a reel associated with the sleeve, a line carrying arm pivoted to said handle and adapted for guiding the line onto the reel, a rack pivoted to said arm for swinging the same, a pinion meshing with said rack, means operated by the movement of said sleeve to oscillate said pinion, and a housing enclosing said reel and said arm.

JOHN CLAY CALDWELL.